3,823,019
MINE WALL COATING
John M. Dale and Allen C. Ludwig, San Antonio, Tex., assignors to the United States of America as represented by the Secretary of the Interior
No Drawing. Filed Sept. 6, 1972, Ser. No. 286,627
Int. Cl. C09d 5/18
U.S. Cl. 106—15 FP         3 Claims

ABSTRACT OF THE DISCLOSURE

A mine wall coating composition is compounded from elemental sulfur, dicyclopentadiene, glass fiber and talc. This composition is applied to mine walls by spraying a molten mixture of the composition at elevated temperature. Preferably, the composition is allowed to age at elevated temperature prior to spraying to permit reaction between the sulfur and the dicyclopentadiene.

---

Plasticized sulfur coating compositions have previously been employed for coating walls in order to strengthen or reduce passage of gases and fluids through the walls, as in the construction of concrete block houses. Such compositions have generally been composed of sulfur, a liquid polysulfide polymer and ¼ to ½ inch lengths of glass fibers. These compositions, however, are expensive, have no fire resistance, have an objectionable odor, are irritating to the eyes, and are difficult to apply with spray equipment, exhibiting a tendency to drip and run.

It has now been found, according to the invention, that a composition containing elemental sulfur, dicyclopentadiene, glass fiber and talc provides a totally new material and technique for coating mine walls. The composition of the invention is readily applied to mine walls by spraying, and exhibits good adhesion and greatly improves the strength and imperviousness of the walls. In addition, the composition is fire resistant, has little or no odor and is not irritating to the eyes.

Although the composition of the invention finds particular utility in coating of mine walls, it may be used in a variety of other coating applications, e.g., for coating earthen tanks, drainage canals, settling tanks, tailings ponds, concrete structures, product storage piles, etc.

The elemental sulfur may be either crystalline or amorphous and may contain small amounts, up to about 2 percent, of impurities such as those normally found in commercial grades of sulfur, without deleterious effects. It is readily and inexpensively available from a variety of sources such as by mining, by means of the Frasch process or the Claus process, by recovery from waste gases, etc. Optimum proportions of sulfur, as well as of the other components of the composition of the invention, may vary considerably depending on the specific use intended. However, proportions of sulfur of about 73 to 97 percent, by weight, are generally satisfactory.

Dicyclopentadiene is also readily available commercially, generally at a purity of about 96 percent or greater It is used in the composition of the invention in an amount of about 1 to 7 percent by weight. It serves the dual function of providing fire resistance and improved adhesion of the formulation to surfaces.

The glass fiber is preferably employed in the form of milled fibers, with the fibers generally ranging from about ¹⁄₃₂ to ⅛ inch in length, preferably with an average length of about ¹⁄₁₆ inch. These fibers, which generally consist of high-silica glass, are readily available commercially, often coated with a starch binder. The type of glass is, however, not critical, provided it provides the resulting composition with adequate shear strength, i.e., a shear strength of about 400 to 800 p.s.i. The glass fiber constitutes about 1 to 5 weight percent of the composition of the invention.

The talc may be a foliated type, or a compact variety such as steatite. Impure varieties such as soapstone may also be used. This ingredient is used in an amount of about 1 to 15 weight percent of the composition, and serves the dual function of providing thixotropy to the mixture and of dispersing the glass fiber throughout the composition, thereby preventing agglomeration of the fibers.

The composition of the invention is applied as a fluid mixture of the ingredients, with the sulfur and dicyclopentadiene in molten form and the glass fiber and talc distributed throughout the molten material. Thus the composition is prepared by homogeneous mixing of the ingredients at elevated temperature sufficient to maintain the sulfur and dicyclopentadiene in a molten state. A temperature of about 240 to 320° F. is satisfactory, with about 275 to 320° F. being preferred. Any conventional vessel or reactor capable of providing the required temperature and mixing means may be used for preparation of the composition in a form suitable for application. Initial reduction of the particle size of the sulfur, as by grinding or pulverizing, may facilitate preparation of the composition.

Application of the composition may be by any means capable of applying a layer of the composition of the invention of suitable thickness. For coating mine walls, a layer of a thickness of about ¹⁄₁₆ inch to ¼ inch is generally preferred. This is usually most conveniently accomplished by means of spray coating, using any apparatus capable of providing a relatively uniform coating of the molten composition in the desired thickness. An airless spraying system in which the spraying pressure is maintained below about 35 p.s.i. has been found to be very satisfactory. In addition, the use of spray nozzles that create a spray pattern, but do not overly atomize the coating composition, are preferred. The use of atomizing air, as employed in conventional paint spray operations is undesirable because of the undue generation of vapors and mist.

It has also been found that generation of vapors or mist in spray coating operations is minimized by a preliminary aging of the coating composition prior to application. This aging, which results in reaction between the sulfur and the dicyclopentadiene, is carried out at the temperature of mixing and application, and for a period of about 30 minutes to 48 hours, preferably about 24 hours. When thus aged, the composition may be applied by spray coating without the use of goggles or respirators.

Coatings of the composition of the invention, as described above, have been found to be highly self-extinguishing. This is believed to be due to an initial burning of the sulfur on the surface of the coating, which causes the dicyclopentadiene to crosslink and, in combination with the talc and sulfur, forms a char that acts as an insulation and protects the substrate from further burning. The presence of the talc, in the proportions described above, has also been found to be advantageous to the formation of a coating that resists the tendency to flow or drip when heat is applied.

EXAMPLE

A tunnel wall and ceiling were spray coated to a thickness of ¼ inch with a composition consisting of 100 parts recovered sulfur, 2 parts dicyclopentadiene, 3 parts milled glass fiber and 10 parts foliated talc. The composition was prepared in a heated autoclave at a temperature of 300° F. and was applied at the same temperature by means of pressure, through a heated flexible hose to a spray nozzle. The resulting coating showed no tendency to flow or drip on being applied, and when subjected to the flame of a propane burner initial surface burning was self-extinguishing 30 seconds after removal of the burner.

We claim:

1. A coating composition consisting essentially of about 73 to 97 weight percent elemental sulfur, about 1 to 7 weight percent dicyclopentadiene, about 1 to 5 weight percent glass fiber, having lengths from about 1/32 to 1/8 of an inch and about 1 to 15 weight percent talc.

2. The composition of claim 1 consisting essentially of about 87 percent sulfur, about 1.7 percent dicyclopentadiene, about 2.6 percent glass fiber and about 8.7 percent talc.

3. A method for preparing a composition for spray coating comprising the steps of (1) compounding the composition of claim 1 and (2) subjecting said composition to a temperature of about 240 to 320° F. for a period of about 30 minutes to 48 hours.

References Cited

UNITED STATES PATENTS

| 3,440,064 | 4/1969 | Ludwig | 106—15 FP |
| 3,465,064 | 9/1969 | Signouret | 106—287 SC |
| 3,674,525 | 7/1972 | Louthan | 106—19 |
| 3,676,166 | 7/1972 | Louthan | 106—287 SC |

LORENZO B. HAYES, Primary Examiner

U.S. Cl. X.R.

106—287 SC; 117—137; 252—8.1